United States Patent
Le Saint

(10) Patent No.: US 10,127,377 B2
(45) Date of Patent: *Nov. 13, 2018

(54) MOBILE CREDENTIAL REVOCATION

(71) Applicant: Assa Abloy AB, Stockholm (SE)

(72) Inventor: Eric F. Le Saint, Los Altos, CA (US)

(73) Assignee: Assa Abloy AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,501

(22) Filed: Dec. 28, 2017

(65) Prior Publication Data

US 2018/0121647 A1 May 3, 2018

Related U.S. Application Data

(63) Continuation of application No. 15/146,924, filed on May 5, 2016, now Pat. No. 9,886,574, which is a
(Continued)

(51) Int. Cl.
*H04L 29/06* (2006.01)
*G06F 21/45* (2013.01)
(Continued)

(52) U.S. Cl.
CPC .............. *G06F 21/45* (2013.01); *G06F 21/33* (2013.01); *G06F 21/34* (2013.01); *H04L 9/0891* (2013.01); *H04L 9/3066* (2013.01); *H04L 9/3234* (2013.01); *H04L 9/3268* (2013.01); *H04L 63/0823* (2013.01); *H04L 63/0853* (2013.01);
(Continued)

(58) Field of Classification Search
CPC .......... G06F 21/45; G06F 21/34; G06F 21/33; H04L 9/3066; H04L 63/0853; H04L 9/3234; H04L 9/0891; H04L 9/3268; H04L 63/12; H04L 63/0823; H04L 2209/80; H04M 1/72577
See application file for complete search history.

(56) References Cited

U.S. PATENT DOCUMENTS

2001/0032310 A1\* 10/2001 Corella ................... H04L 9/002
713/156
2002/0062438 A1\* 5/2002 Asay ....................... G06Q 10/10
713/157
(Continued)

*Primary Examiner* — Morshed Mehedi
(74) *Attorney, Agent, or Firm* — Muirhead and Saturnelli, LLC

(57) ABSTRACT

Managing validity status of at least one associated credential includes providing a credential manager that selectively validates associated credentials for at least one device, the device invalidating a corresponding associated credential, and the device requesting that the credential manager validate the corresponding associated credential after invalidating the associated credential. The associated credential may be invalidated based on an external event, such as a user invalidating the associated credential from a UI of the device, a user improperly entering a pin value, a user indicating that a corresponding device is lost, the device entering sleep mode, the device locking a user interface thereof, the device shutting down, and a particular time of day. The at least one associated credential may be provided on an integrated circuit card (ICC) that may be part of a mobile phone and/or a smart card.

24 Claims, 8 Drawing Sheets

Related U.S. Application Data continuation of application No. 14/287,289, filed on May 27, 2014, now Pat. No. 9,361,452, which is a continuation of application No. 14/240,496, filed as application No. PCT/US2012/053479 on Aug. 31, 2012.

(60) Provisional application No. 61/529,536, filed on Aug. 31, 2011.

(51) Int. Cl.
*G06F 21/33* (2013.01)
*G06F 21/34* (2013.01)
*H04L 9/32* (2006.01)
*H04L 9/08* (2006.01)
*H04L 9/30* (2006.01)
*H04M 1/725* (2006.01)

(52) U.S. Cl.
CPC ........ *H04L 63/12* (2013.01); *H04M 1/72577* (2013.01); *H04L 2209/80* (2013.01)

(56) References Cited

U.S. PATENT DOCUMENTS

| | | | |
|---|---|---|---|
| 2007/0203850 A1* | 8/2007 | Singh | G06Q 20/327 705/67 |
| 2008/0201767 A1* | 8/2008 | Williams | G06F 21/31 726/6 |
| 2009/0132813 A1* | 5/2009 | Schibuk | G06Q 20/223 713/158 |
| 2011/0035584 A1* | 2/2011 | Meyerstein | H04W 8/265 713/155 |
| 2011/0055913 A1* | 3/2011 | Wong | H04L 63/08 726/9 |
| 2011/0145925 A1* | 6/2011 | Peirce | H04L 63/062 726/26 |
| 2014/0007208 A1* | 1/2014 | Faludi | G06F 21/00 726/7 |
| 2014/0189782 A1* | 7/2014 | Mendelovich | G06F 21/33 726/1 |

* cited by examiner

MOBILE CREDENTIAL REVOCATION

RELATED APPLICATIONS

This application is a continuation of U.S. application. Ser. No. 15/146,924 filed May 5, 2016 (pending), which is a continuation of U.S. application. Ser. No. 14/287,289 filed May 27, 2014 (9,361,452), which is a continuation of U.S. application. Ser. No. 14/240,496 filed Feb. 24, 2014 (abandoned), which is a National Stage of International App. No. PCT/US2012/053479 filed Aug. 31, 2012, and claims priority to U.S. Provisional application 61/529,536 filed Aug. 31, 2011, which are all incorporated herein by reference.

CROSS-REFERENCE TO RELATED APPLICATIONS

This application claims priority to U.S. provisional patent application No. 61/529,536 filed on Aug. 31, 2011, which is incorporated by reference herein.

TECHNICAL FIELD

This application is related to the field of digital credential management and, more particularly, to the field of digital credential management using multiple entities.

BACKGROUND OF THE INVENTION

Credentials consist of data that can be used to prove of ownership of privilege, role, rights, etc. (i.e., an assertion) and generally include or are constructed a secret, policy information, event parameters, a value or identity assertion and/or an authentication function that binds the secret and the parameters with the assertion. Example credentials include PKI certificates and the corresponding private keys, such as X.509 certificates and associated private keys. Other example credentials are HID iCLASS, One Time Passwords based on Symmetric Keys, or simply a password and an account identifier. Since the secret part of the credential needs protection, the secret part of the credentials may be located in a secure element. UICC, SIM, MicroSDs, and Embedded Hardware Security modules are examples of Secure elements provided, for example, on a mobile phone.

A credential may be revoked if the assertion corresponding to the credential is no longer true. For example, if a user leaves an organization, then a user's credentials that allow physical access to the facilities of the organization may need to be revoked. There are a number of mechanisms for revoking credentials, including, for example, disabling use of a credential associated to a mobile phone at a credential verification back office or by requesting the credential issuer to set the credential status to revoked and then publishing the credential status. Known credential revocation techniques may be relatively slow, expensive and not very scalable and may adversely impact credential verification systems. For example, X.509 certificate revocation systems require the publication and distribution of certificate revocation lists (CRLs) from the credential issuer, or the use of certificate status responders, both of which may be inherently time delayed so that, depending on the frequency of revocation and the time it takes to distribute the CRLs, there may some time in which the credential can still be used after the credential has been revoked.

It is desirable to provide a system that addresses shortcomings of known credential revocation systems.

SUMMARY OF THE INVENTION

According to the system described herein, managing validity status of at least one associated credential includes providing a credential manager that selectively validates associated credentials for at least one device, the at least one device invalidating a corresponding associated credential and the at least one device requesting that the credential manager validate the corresponding associated credential after invalidating the associated credential. The associated credential may be invalidated after a time period. Invalidating the corresponding credential may limit scope of use of the credential and/or prevent use of the credential while validating the credential may allow use of the credential. The credential manager may include a credential validation function and/or a credential revocation function. The associated credential may be invalidated based on an external event. The external event may be selected from the group consisting of one or more of: a user invalidating the associated credential from a UI of the at least one device, a user improperly entering a pin value, a user indicating that a corresponding device is lost, the at least one device entering sleep mode, the at least one device locking a user interface thereof, the at least one device shutting down, the device losing connection to a network, the device leaving a location or area, the device configuration changing, and a particular time of day. The at least one associated credential may be provided on an integrated circuit card (ICC). The ICC may be part of a mobile phone and/or a smart card. The at least one associated credential may be provided within a trusted execution environment of a device. The at least one associated credential may be invalidated based on an internal event. The internal event may be selected from the group consisting of one or more of: a counter reaching a limit, a clock reaching a limit, a configuration change of the trusted execution environment, and a configuration change of the ICC. The at least one associated credential may be implemented using one of: iCLASS, Elliptic Curve Cryptography (ECC), X.509, Card Verifiable Certificate, and symmetric key cryptography and wherein the primary credential is an X.509 digital certificate. Managing validity status of at least one associated credential may also include the credential manager receiving external input indicating that the corresponding associated credential should not be validated. The external input may be provided by a user. The associated credential may be invalidated after the credential is used. Validation of the associated credential may includes validation of a primary credential and the associated credential may be deemed invalid when the primary credential is invalid.

According further to the system described herein, computer software, provided in a non-transitory computer-readable medium, manages validity status of at least one associated credential. The software includes executable code that selectively validates associated credentials for at least one device, where the at least one device invalidates a corresponding associated credential and executable code that receives a request from the at least one device that the credential manager validate the corresponding associated credential after invalidating the associated credential. The associated credential may be invalidated after a time period. Invalidating the corresponding credential may limit scope of use of the credential and/or prevent use of the credential while validating the credential may allow use of the credential. The credential manager may include a credential validation function and/or a credential revocation function. The associated credential may be invalidated based on an external event. The external event may be selected from the group consisting of one or more of: a user invalidating the associated credential from a UI of the at least one device, a user improperly entering a pin value, a user indicating that a corresponding device is lost, the at least one device entering sleep mode, the at least one device locking a user interface thereof, the at least one device shutting down, the device losing connection to a network, the device leaving a location or area, the device configuration changing, and a particular time of day. The at least one associated credential may be provided on an integrated circuit card (ICC). The ICC may be part of a mobile phone and/or a smart card. The at least one associated credential may be provided within a trusted execution environment of a device. The at least one associated credential may be invalidated based on an internal event. The internal event may be selected from the group consisting of one or more of: a counter reaching a limit, a clock reaching a limit, a configuration change of the trusted execution environment, and a configuration change of the ICC. The at least one associated credential may be implemented using one of: iCLASS, Elliptic Curve Cryptography (ECC), X.509, Card Verifiable Certificate, and symmetric key cryptography and wherein the primary credential is an X.509 digital certificate. The software may also include executable code that receives an external input indicating that the corresponding associated credential should not be validated. The external input may be provided by a user. The associated credential may be invalidated after the credential is used. Validation of the associated credential may include validation of a primary credential and the associated credential may be deemed invalid when the primary credential is invalid.

According further to the system described herein, a validation system includes a credential manager that selectively validates associated credentials for at least one device and at least one device, coupled to the credential manager, that invalidates a corresponding associated credential and subsequently requests that the credential manager validate the corresponding associated credential after invalidating the associated credential.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
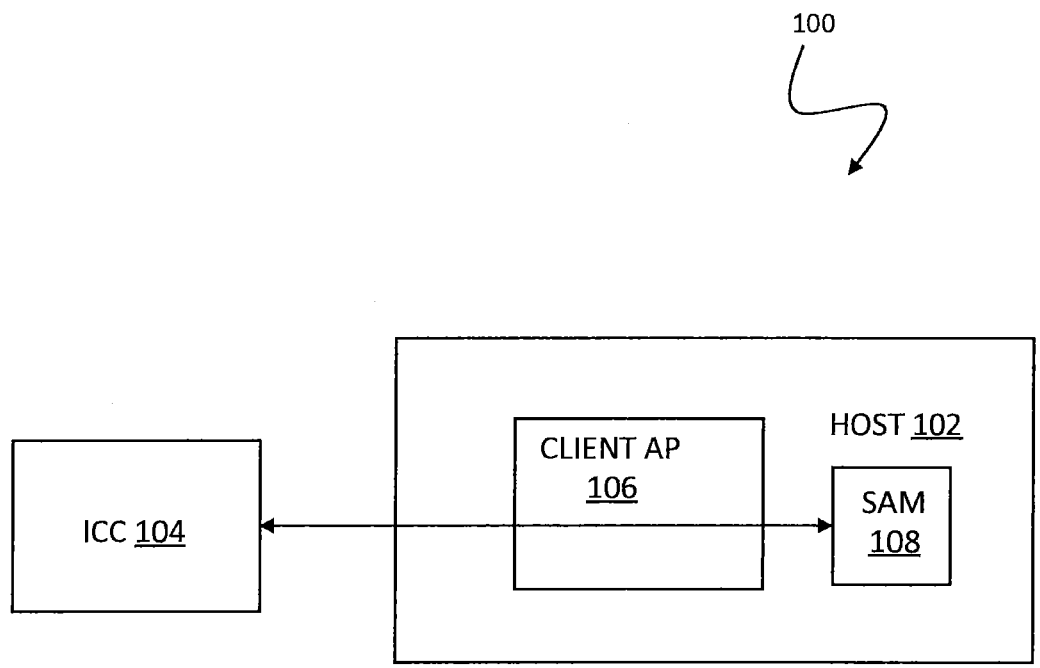
FIG. 1 is a schematic illustration showing an Integrated Circuit Card (ICC) and a host according to an embodiment of the system described herein.

FIG. 1 is a diagram of a system 100 that includes a host 102 in communication with an integrated circuit card (ICC) 104. The host 102 may be a terminal and/or server with protected access. Generally, the host 102 may be any other unit or collection of units capable of establishing a logical communication channel with a device, such as the ICC 104. The host 102 may include a client application 106 and a secure application module (SAM) 108. Although discussed principally herein in connection with use the SAM 108, the system described herein may also operate in connection with devices using a trusted platform module (TPM), hardware security module (HSM) and/or other type of cryptographic module, such as a software module, or a module embedded in a CPU. Furthermore, although the client application 106 is shown and discussed principally herein as a separate component with separate functionality from the SAM 108, in other embodiments, the client application 106 may be incorporated into the SAM 108.

The ICC 104, such provided on a smart card, mobile phone and/or other similar device, communicates with SAM 108 via the host 102 using a contact, contactless interface, USB, or other type of communications mechanism. The system 100 may provide secure contact or contactless communication between the ICC 104 and the host 102 using any appropriate mechanism to provide protection from attacks that include skimming, sniffing and man-in-the middle attacks and may provide forward secrecy, as further discussed elsewhere herein. The system described herein may operate in compliance with NIST cryptographic mandates, including NIST SP 800-56A or 800-56B (which is incorporated herein by reference), NIST SP 800-57 Part 1, entitled "Recommendation for Key Management" by Elaine Barker et al. (revised, March 2007), which is incorporated herein by reference, and Federal Information Processing Standards (FIPS) 140-2, entitled "Security Requirements for Cryptographic Modules," May 25, 2001, with change notice Dec. 3, 2002, which is incorporated herein by reference. The system 100 may further include the ability to fulfill NSA recommendations on the choice of cryptography (SUITE-B). The system 100 may support full secure messaging for application data or key exchange. It should be noted that other appropriate standards may also be utilized in connection with the system described herein, as would be understood by one of ordinary skill in the art.

Integration specifications for the host 102, the SAM 108, and/or the ICC 104 interfaces may be provided for the system described herein. For the client application 106, the integration may use a single command from the ICC 104 that includes a public key and identification data generated by the SAM 108. A response by the ICC 104 may be directly forwarded to the SAM 108 for processing. The SAM 108 may return authenticated credentials for the ICC 104. Session keys (e.g., symmetric session keys) may be established on both sides.

In an embodiment herein, the client application 106 calls the SAM 108 to generate an ephemeral Elliptical Curve (EC) key pair. The client application 106 then sends an authentication command to the ICC 104, including a public ephemeral key. Then, the client application 106 forwards the authentication response of the ICC 104 as a second authentication command to the SAM 108. If successful, then session keys are established on both sides. The client application 106 builds application protocol data unit (APDU) commands, calls the SAM 108 to wrap (encapsulate) the APDU commands, and then sends the wrapped commands to the ICC 104. In an embodiment, the APDU interface may be an ISO 7816-4 card edge interface.

The system 100 may provide authentication, such as PKI authentication, of a smart card and/or mobile phone with a secure element that may be presented to one or more hosts. The hosts may include one or more hosts that are part of and/or otherwise incorporated into a door or door controller for controlling physical access and into desktops, laptops and/or kiosks for controlling logical access. Use of secure messaging provides an end-to-end protected path for document or transaction decryption and signatures using the secure element or smart card. The end-to-end secure messaging may provide for the transport of PIN or biometrics or physical access control system (PACS) credentials via contactless communication. The system described herein may also be used in connection with PKI-based authentication and ticketing for transit applications. The system described herein may further be used to provide end-to-end post issuance management of the smart card or secure element in a contact or contactless environment.

Note that authentication of the ICC 104 by the host 102 may include receiving authentication information from the ICC 104. The authentication information from the ICC 104 can take any form, including a X.509 PKI digital certificate, an EC digital certificate, or some other appropriate form. In some cases, the authentication information may be embedded by the manufacturer/issuer of the ICC 104 while in other cases the authentication information may be loaded on to the ICC 104 some time after manufacture/issuance. Note that it is also possible to have a combination where some authentication information is provided by the manufacturer/issuer and the information is updated and/or replaced at a following time by new authentication information. It is also possible to have authentication information on the ICC 104 that does not expire.

In some cases, authentication information on the ICC 104 may include an expiration date of the authentication information, after which the ICC 104 is no longer considered valid. For example, an X.509 PKI digital certificate may contain an expiration date. Once the authentication information on the ICC 104 has expired, a user either obtains a new ICC or updates/replaces the authentication information on the ICC 104 with authentication information having a new expiration date.

Sometimes it is desirable to revoke authentication information provided on the ICC 104. For example, if the ICC 104 is an identification/access badge of an employee that leaves a company, the company would like to immediately revoke the ICC 104 so that the ex-employee no longer has company access. This is especially important in instances where the company does not have an opportunity to take physical possession of the badge, such as when an ex-employee is hostile to the company. In some instances, authentication information is provided in a form that provides an effective revocation mechanism, such as X.509 digital certificates. However, in other instances, there may be no straight-forward revocation mechanism.

Figure 2:
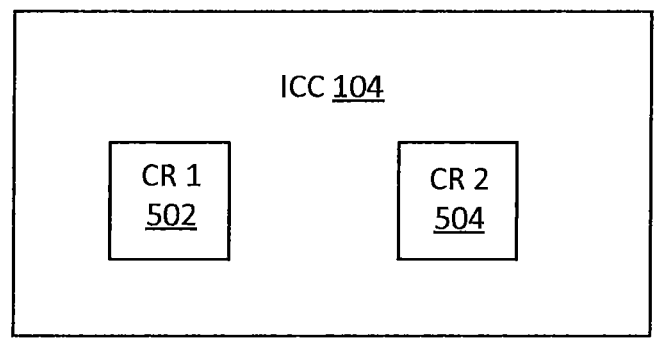
FIG. 2 is a schematic illustration showing an Integrated Circuit Card (ICC) with associated and primary credentials according to an embodiment of the system described herein.

Referring to FIG. 2, the ICC 104 is shown in detail as including an associated credential (CR 1) 502 and a primary credential (CR 2) 504. The associated credential 502 may be used to authenticate the ICC 104 while the primary credential 504 may be used to provide revocation status for the associated credential 502. The credentials 502, 504 may be the same type of credential (e.g., both of the credentials 502, 504 are X.509 digital certificates) or the credentials 502, 504 may be different types of credentials (e.g., the associated credential 502 uses ECC and a Card Verifiable Certificate (CVC) and the primary credential 504 is an X.509 digital certificate).

Although the primary and associate credentials 502, 504 may have many things in common (certificate subject, issuer id, etc.), the credentials 502, 504 are cryptographically independent so that there is no direct or indirect cryptographic relationship between the associated credential 502 and the primary credential 504. Cryptographic independence may be distinguished from current PKI technology (and similar), where credentials may belong to the same certification path (chain) so that the secrets and/or private key associated with one credential are used to form cryptograms that are necessary to establish trust in another credential. Note that cryptographic dependence between two credentials can be direct or indirect. Cryptographic dependence between credentials is direct when a cryptographic operation applies one of the secrets/keys of one of the credentials directly to the other one of the credentials. Cryptographic dependence between credentials is indirect when a cryptographic operation applies one of the secrets/keys of one of the credentials to at least one intermediary credential that applies secrets/keys thereof directly to the other one of the credentials.

The credentials 502, 504 being cryptographically independent means that no secrets and/or private key associated with one of the credentials 502, 504 is used to form cryptograms, directly or indirectly, that are necessary to establish trust in the other one of the credentials 502, 504. Thus, without more (e.g., binding the credentials 502, 504, discussed in detail elsewhere herein), a change in revocation status of one of the credentials 502, 504 does not automatically change the revocation status of the other one of the credentials 502, 504. This is in contrast with a cryptographically dependent PKI certificate chain, where if a credential higher in the chain is revoked, then a certificate lower in the chain is automatically revoked too.

Following creation of the credentials 502, 504, there is a binding so that the revocation state of the associated credential 502 is tied to the revocation state of the primary credential 504 where the associated credential 502 is deemed revoked if the primary credential 504 is revoked. In some cases, the associated credential 502 is deemed not revoked if the primary credential is not revoked while in other cases the associated credential 502 may be revoked independently of the revocation state of the primary credential 504. Under such a system, the associated credential 502, which authenticates the ICC 104, can use any type of authentication mechanism, including a non-revocable authentication mechanism.

As an example of using different types of credentials, the ICC 104 may be used for opening a door for the holder of the ICC 104. The associated credential 502 may be implemented using ECC and CVC to facilitate rapid processing when the user presents the ICC to the door controller (i.e., the host 102). The primary credential 504 may be an X.509 certificate. When the ICC 104 provides authentication to the host 102, the host 102 can confirm the associated credential 502 to determine whether to open the door and, in parallel, can check the revocation status of the primary credential 504 using conventional X.509 certificate revocation data (i.e., CRL information, OCSP response, etc.). If the primary credential 504 is revoked, then the associated credential 502 is deemed revoked. Thus, even if the ICC 104 is properly authenticated using the associated credential 502 which itself is not revoked, the door controller (host 102) does not open the door if the primary credential 504 has been revoked. Accordingly, the system described herein may provide for effective revocation of otherwise non-revocable credentials. Note also that, even in instances where the associated credential 502 is revocable, it may still be advantageous to use the primary credential 504 as a surrogate for the revocation status of the associated credential 502.

Any appropriate mechanism may be used to bind the cryptographically independent credentials 502, 504. Thus, the binding may be provided by a data structure that relates the two credentials and/or some other data provided that is accessible to any entities that rely on the binding and/or that modify the binding. For example, the binding mechanism may be an indication at the host 102 that associated credential 502 is deemed to be revoked if the primary credential 504 is revoked. For a first alternative, binding the associated credential 502 to the primary credential 504 may be done by including a reference to the primary credential 504 within the information for the associated credential 502 at the time of issuance of the associated credential 502. For a second alternative, the binding may be performed by including the same user or unique device identifier in both of the credentials 502, 504 at the time of issuance of the credentials 502, 504. For either alternative, upon presentation of the associated credential 502, the host 102 may read the reference to the primary credential 504 from the associated credential and searches for the revocation status of the primary credential 504 via a CRL, OCSP or other method.

For another alternative, the binding may be independent of the contents of the credentials 502, 504 and may be independent of whether any of the credentials 502, 504 authenticate any other ones of the credentials 502, 504. Thus, there may be no binding information provided with the contents of either of the credentials 502, 504. For instance, an access control system may determine the binding between the associated credential 502 and the primary credential 504 at registration time, when the same person can prove ownership of both of the credentials 502, 504

Testing the revocation status of the primary credential 504 may include also authenticating the primary credential 504, where, if the primary credential 504 cannot be authenticated, the primary credential 504 is deemed revoked. Note also that, in some cases, the ICC 104 may simply identify an authenticable credential stored in a location outside the ICC 104. For example, the ICC 104 could simply identify a serial number of an X.509 digital certificate (primary credential), which can be checked against a CRL for revocation status.

Figure 3:
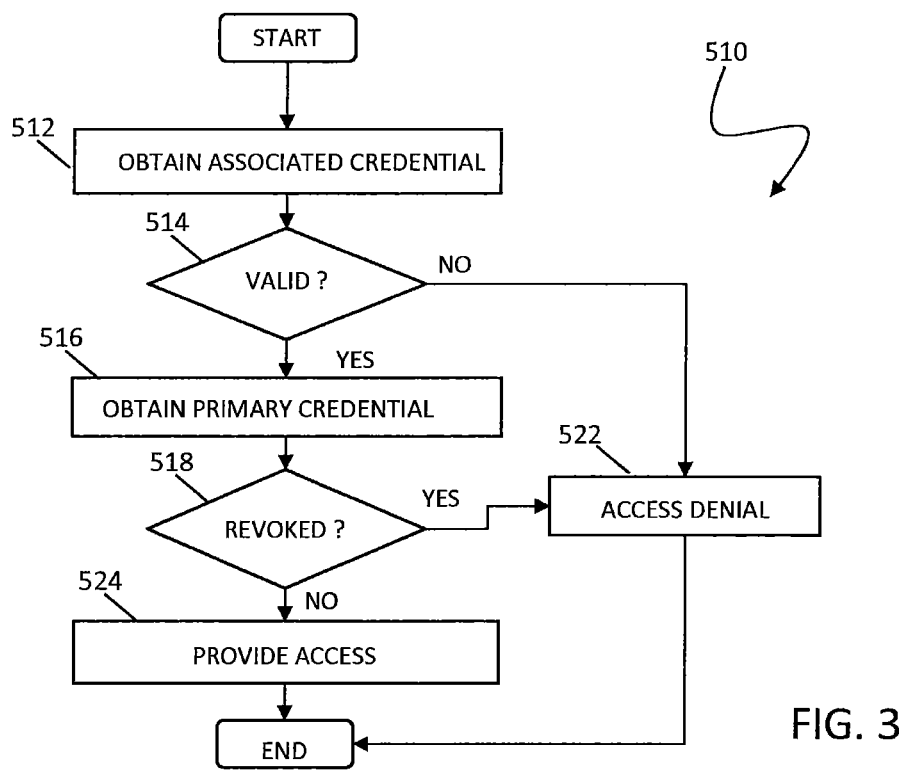
FIG. 3 is a flow diagram showing processing in connection with authenticating and determining revocation status of an associated credential accord according to an embodiment of the system described herein.

Referring to FIG. 3, a flow chart 510 illustrates in detail processing performed by the host 102 in connection with authenticating the ICC 104 when the ICC 104 uses associated and primary credentials 502, 504. Processing begins at a first step 512 where the host 102 obtains the associated credential 502 (e.g., from the ICC 104). Following the step 512 is a test step 514 where it is determined if the associated credential 502 is valid. The test at the step 514 determines if the associated credential 502 is revoked and whether the associated credential 502 properly authenticates the ICC 104. Note that the associated credential 502 may use any appropriate authentication mechanism and/or revocation mechanism. In some cases, the associated credential 502 may use a non-revocable authentication mechanism, in which case the test at the step 514 determines authentication of the associated credential 502 but not revocation status.

If it is determined at the test step 514 that the associated credential 502 is valid (properly authenticates the ICC 104 and is not revoked), then control passes from the test step 514 to a step 516 where the host 102 obtains the primary credential 504 from the ICC 104. Following the step 516 is a test step 518 where it is determined if the primary credential 504 is revoked. As discussed elsewhere herein, in some cases, prior to determining the revocation status of the primary credential 504, it may be useful to first authenticate the primary credential 504. Thus, in some cases, the test step 518 may represent a combined authentication/revocation test of the primary credential 504.

If it is determined at the test step 518 that the primary credential is revoked, then control passes from the test step 518 to a step 522 where access denial processing is performed, as discussed elsewhere herein. Following the step 522, processing is complete. Note that the step 522 is also reached from the step 514 if the associated credential is not valid (i.e., is revoked or does not authenticate the ICC 104). Thus, the primary credential 504 is a surrogate for the associated credential 502 in that, if the primary credential 504 is revoked, access is denied just as if the associated credential 502 had been revoked, irrespective of the revocation status of the associated credential 502 and even irrespective of whether the associated credential 502 is revocable at all. If it is determined at the test step 518 that the primary credential is not revoked, then control passes from the test step 518 to a step 524 where access is allowed. Following the step 524, processing is complete.

Note that, although the associated credential 502 is deemed revoked if the primary credential 504 is revoked, the reverse may not necessarily be true. That is, in some embodiments, the associated credential 502 may be revoked independently of the revocation status of the primary credential 504 so that the associated credential 502 is revoked but the primary credential 504 is not. In other embodiments, such as embodiments where the associated credential 502 is irrevocable, the revocation state of the associated credential 502 tracks the revocation state of the primary credential 504.

Figure 4:
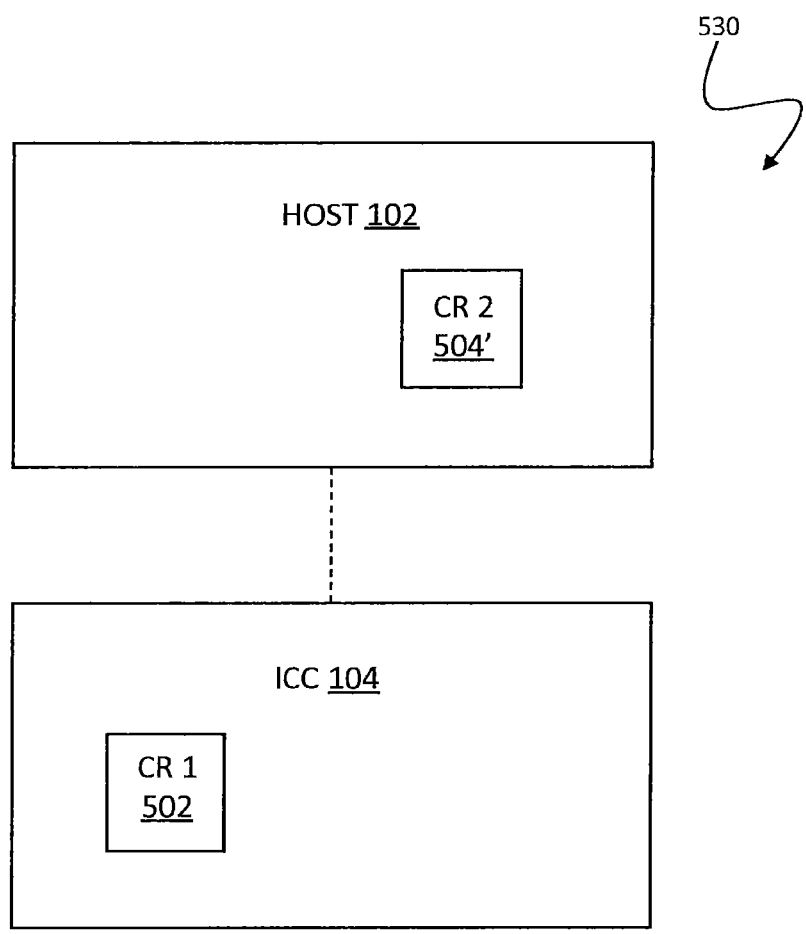
FIG. 4 is a schematic illustration showing an Integrated Circuit Card (ICC) with an associated credential and a host with a primary credential according to an embodiment of the system described herein.

Referring to FIG. 4, a diagram 530 illustrates an alternative configuration in which the associated credential 502 is provided with the ICC 104, but a primary credential 504' is stored on the host 102. The primary credential 504' is used just like the primary credential 504 described elsewhere herein, except that, instead of being stored on the ICC 104, the primary credential 504' is provided on the host 102. Thus, for the configuration illustrated by the diagram 530, it is not necessary for the host 102 to obtain the primary credential 504' from the ICC 104. The primary credential 504' may be provided to the host 102 from any number of sources, including an initial transfer from the ICC 104, a secure transfer over the Internet from a remote host (not shown), a user inserting a USB drive or a disk (containing the primary credential 504') into a reader at the host 102, etc.

Figure 5:
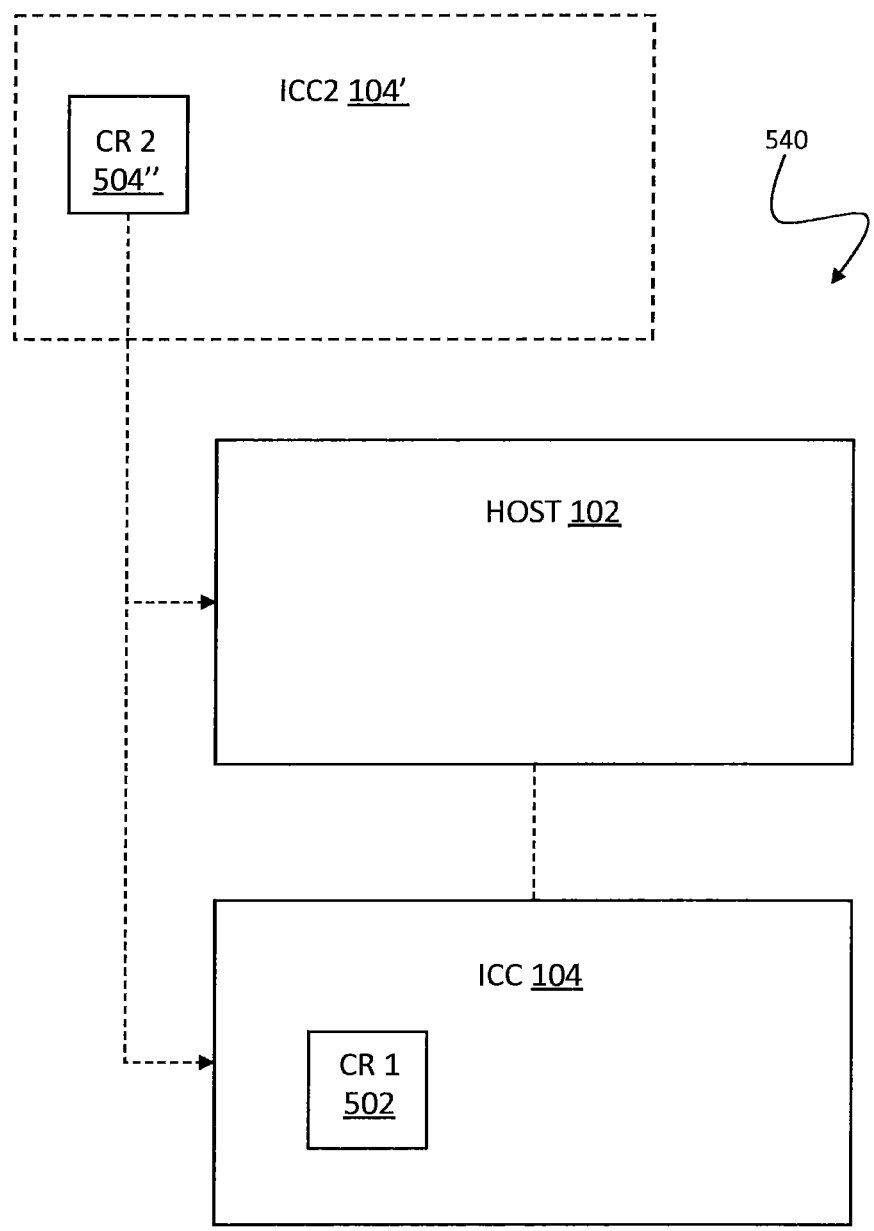
FIG. 5 is a schematic illustration showing an Integrated Circuit Card (ICC) with an associated credential and a host where a primary credential is provided outside the ICC and the host according to an embodiment of the system described herein.

Referring to FIG. 5, a diagram 540 illustrates an alternative configuration in which the associated credential 502 is provided with the ICC 104, but a primary credential 504" is stored outside both the host 102 and the ICC 104. The primary credential 504" is used just like the primary credential 504 and the primary credential 504' described elsewhere herein, except that, instead of being stored on either the host 102 or the ICC 104, the primary credential 504" is provided external to both. Thus, for the configuration illustrated by the diagram 540, the host 102 obtains the primary credential 504" from a source other than the ICC 104, such as from a remote host (not shown) that transfers the primary credential 504" using a secure channel. The transfer may be over the Internet or by some other medium. In some embodiments, the primary credential 504" may be provided on a second ICC 104' that is separate from the ICC 104 that contains the associated credential 502.

In some embodiments, it may be the responsibility of the entity relying on the revocation status (e.g., the host 102) to locate the primary credential 504". If the primary credential 504" is transferred to the ICC 104, then the system may operate like that illustrated in FIG. 2 and described above. Alternatively, if the primary credential 504" is transferred to the host 102, then the system may operate like that illustrated in FIG. 4 and described above. In some embodiments, it is not necessary to provide the primary credential 504" itself, but only information about the primary credential 504" (e.g., serial number) so that the revocation status of the primary credential 504" can be checked.

As an example of the system illustrated in FIG. 5, the ICC 104 may correspond to a cell phone issued to a user. The host 102 may correspond to a door controller that opens a secure door. The associated credential 502 is stored in the cell phone that the user presents to the host 102 to open the door. The user may also have a PIV card that corresponds to the second ICC 104' and that contains the primary credential 504". So long as the primary credential 504" is not revoked, the user can open the door using the associated credential 502 on the ICC 104 (cell phone). However, if the host 102 detects that the primary credential 504" has been revoked (e.g., the PIV card 104' is no longer valid), then the host 102 deems the associated credential 502 to also be revoked so that the ICC 104 (cell phone) can no longer be used to open the secure door. If the cell phone (ICC 104) is lost or stolen, but the PTV (second ICC card 104') is not, it may be possible to revoke the associated credential 502, but not the primary credential 504". Thus, revocation of the primary credential 504" guarantees revocation of the associated credential 502, but non-revocation of the primary credential 504" does not guarantee non-revocation of the associated credential 502.

Figure 6:
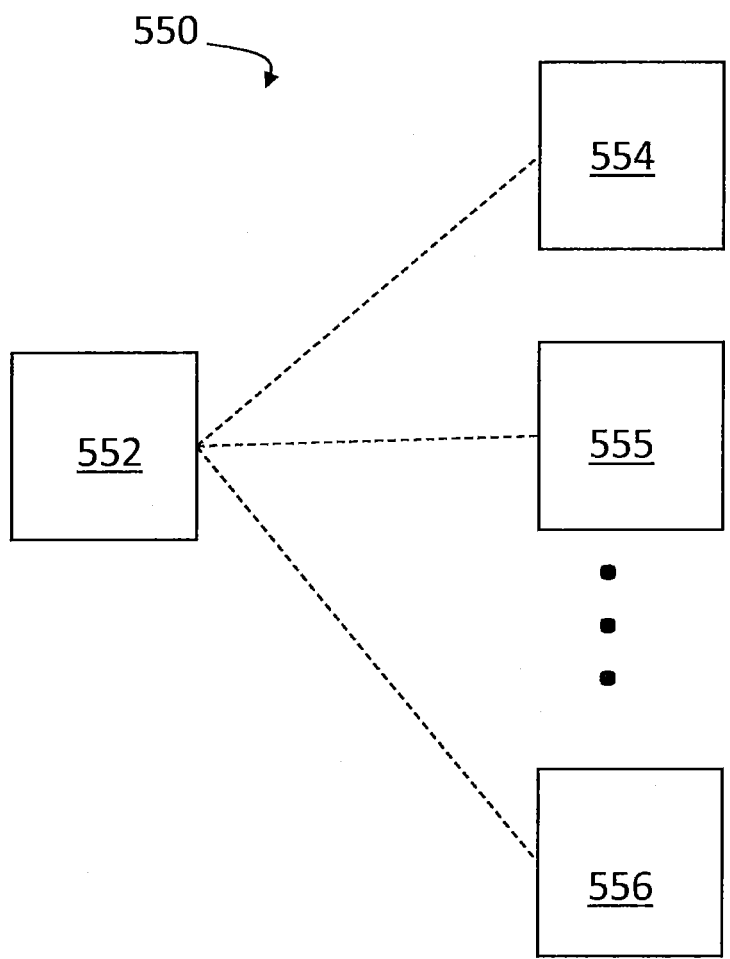
FIG. 6 is a schematic illustration showing a primary credential and a plurality of associated credentials according to an embodiment of the system described herein.

Referring to FIG. 6, a diagram 550 illustrates a primary credential 552 being bound to a plurality of associated credentials 554-556. Revocation status of all of the associated credentials 554-556 varies according to the revocation status of the primary credential 552. Thus, if the primary credential 552 is revoked, all of the associated credentials 554-556 are deemed revoked. One use of a system like that illustrated by the diagram 550 is a situation where each of the associated credentials 554-556 relates to a separate device that a user is issued as an employee of a company (e.g., cell phone, parking pass, access card, etc.) and the revocation state of the primary credential 552 corresponds to the user's employment status with the company. If the user leaves the company, the primary credential 552 is revoked, thus causing all of the associated credentials 554-556 to be effectively revoked.

In some embodiments, the primary credential may contain a pointer or other identifier that indicates the associated credential(s). It is also possible for the associated credential(s) to contain pointer(s) or other identifier(s) that indicates the primary credential. In other embodiments, none of the primary credential or the associated credential(s) contain any indication of the others. It is also possible for one or more of the associated credentials to have the same or a similar identifier as the primary credential. In other embodiments, the identifiers may be independent. One or more of the associated and primary credentials may be authenticated, at least partially, by another one of the associated and primary credentials. Note that the system described herein may be used in instances where the associated credential is not revocable (and/or not easily revocable), but it is still desirable to provide an expiration of the ICC 104 after a predetermined amount of time (e.g., one year) by revoking the primary credential.

An example of the system described herein is to use Elliptic curve authentication keys or symmetric device authentication keys on a PIV card to accelerate contactless PKI authentication at a door. A key pair and a Card Verifiable Certificate (CVC) may be used as a primary credential to authenticate the personal authentication device. The primary credential may be located on the same device as the PIV card, but may be logically separated from the PIV application, and provide a different level of trust. A secure channel session key established from the CVC authentication may be used to authenticate a reference to a PIV certificate that is encrypted with the session key. Accordingly, the PIV certificate reference is bound to the session keys and the static key and CVC. Since the reference to the PIV certificate is trusted to be bound to the keys and the device, the verification process at the door controller may verify the PIV certificate revocation status and additional attributes such as its expiration date to determine if the device being presented is valid.

Another example is a primary credential that is located on a device distinct from the device holding the primary PKI certificate. An embedded secure element of a mobile phone may use iCLASS keys for authentication that are bound to the primary PIV credential stored in the original separate PIV card of the device owner. The mobile phone may be used to access a mass transit system using the iCLASS keys. Using the process described herein, the mobile phone provides the identifier of the primary PIV card certificate, authenticated from the iCLASS keys. The primary PIV certificate status may be retrieved and used at the door controller to determine if the mobile phone can be considered a valid device.

It may also be desirable to provide other light weight revocation/invalidation techniques for credentials installed in mobile devices that are often connected. For example, an NFC phone containing iCLASS credential may be protected by a secure element such as microSD or UICC used for allowing physical access. The same phone and corresponding credentials may be used at physical access systems in which it is registered. The phone may perform a challenge-response through the NFC interface to authenticate to the door controller. The credential consists of a CVC and elliptic curve private key inside the secure element. The physical access system may be independent from the credential issuance system but trusts the issuance system and the protection of the credential. If the NFC phone is lost, an attacker could potentially gain illicit entry to buildings in which the phone's credential is registered. It may be impractical for the phone's owner to insure that the credential has been deactivated, so automated activation/deactivation mechanisms may be considered.

In an embodiment of the system described herein, the phone or mobile device owner would contact the credential issuer, validation or management system to report a lost or stolen phone or device and the credential issuer, validation or management system would invalidate the credential. Invalidating the credential may result in temporarily revoking the credential and update its revocation/validity status in the credential issuer, management or validation system. Invalidating the credential may also result in deactivating the credential on the device, or temporarily disable or partially limit its scope of use from the device. Alternately a credential manager may invalidate the credential if some event occurs such as an account termination. In another embodiment, the phone or device itself may determine that the credential should be automatically invalidated. A credential may be disabled or deactivated on the device following a time delay after its activation, following an explicit deactivation from the UI, following a locking of the device or after entering sleep mode, etc. In another embodiment, the phone or mobile device may deactivate the credential when the phone cannot determine that the correct owner is present. For example, the credential may be disabled if a PIN used to unlock the phone is entered incorrectly after several attempts, if a voice mail password is entered wrong after several attempts, or if the phone determines that the voice on the initiating side of a call does not belong to the owner. In another embodiment, the phone or mobile device may automatically deactivate the credential when it leaves a specific location or area using GPS information, or when the device connection to a network is lost or interrupted, such as LAN, WAN, Bluetooth, Wi-fi, In another embodiment, the phone or mobile device may automatically deactivate the credential when the device configuration changes, such as device Operating System update.

When a credential is invalidated or revoked, the logical or physical access systems will not need to process any revocation information, and the effect of revocation/invalidation will invariably be shorter and more convenient. Also, the solution can occur without effect on the phone owner, i.e. all the revocation/invalidation mechanisms happen in the background.

As described above, when associated credentials are used (e.g., on a cell phone), the life cycle of such associated credentials may be conditioned on the primary credential, such as a PIV certificate. The associated credential may be used to authenticate a corresponding device, but the credential management system or physical access system may check the primary credential revocation status in instances where the revocation status conditions the validity of the associated credential. However, there may be instances where it is desirable to cause an associated credential to be revoked and/or invalidated without revoking a primary credential. For example, if a PIV certificate is used for the primary credential, and there are a significant number of associated credentials, including credentials associated with a user's cell phone, it is desirable to not have to revoke the PIV card (and thus cause all of the associated credentials to be revoked) when the user loses only his cell phone.

The system described herein includes a device requesting validation of an associated credential from a credential issuance or management system, with the authorization to enable, activate, create or replace the credential that was previously invalidated, deactivated, disabled, deleted or if the scope of use of the credential has been partially limited. For example, a cell phone may request credential validation from a credential management system or a credential validation system. This may occur upon user authentication to the device, or upon explicit user request before using the credential, or immediately after a disabling event is processed, or with periodic attempts if the credential is disabled, or when the device is first connected to a network, such as LAN, WAN, Bluetooth, Wi-fi, or when the device is located nearby a facility, according to GPS location coordinates, or relative location information, or upon an event that occurs after the credential has been disabled.

The credential manager or credential validation system revokes and/or invalidates credentials. The credential manager or credential validation system may or may not authorize the re-enablement, re-activation, renewal of the credential after the device has contacted the credential management or validation system, and the credential may be maintained in an invalid, revoked state or a state of limited use. If an authorized party (e.g., an owner) has indicated that a invalidated or revoked credential should not be validated, enabled, activated, then the server may simply not authorize a new/revised credential for the device. In some cases, the server may conditionally authorize one or more credentials for a device based on appropriate criteria. For example, if a device is used for physical access, then the server may only authorize the device at particular times (e.g., weekdays between 8:00 am and 6:00 pm).

Disabling associated credentials may be performed in a secure manner. In some cases, if the associated credential relies on a secure element (e.g., tamper-proof chip), or a trusted execution environment, it may be desirable that the secure element is not disabled by an external event, but, instead, by an internal event from the trusted domain defined by the secure element (ICC) or the trusted execution environment. In some cases an counter or clock managed within the trusted domain (rather than an external counter or external clock) may be used to determine when to periodically revoke/disable associated credentials. Alternatively, an external clock event may be used to disable a credential shortly after the credential has been used, which may be long before the device (e.g., cell phone) is lost and used for attacks. Credential invalidation may occur in response to a configuration change of the trusted execution environment and/or the ICC. A user may cause invalidation of credentials for a device right before the device is used for access.

Figure 7:
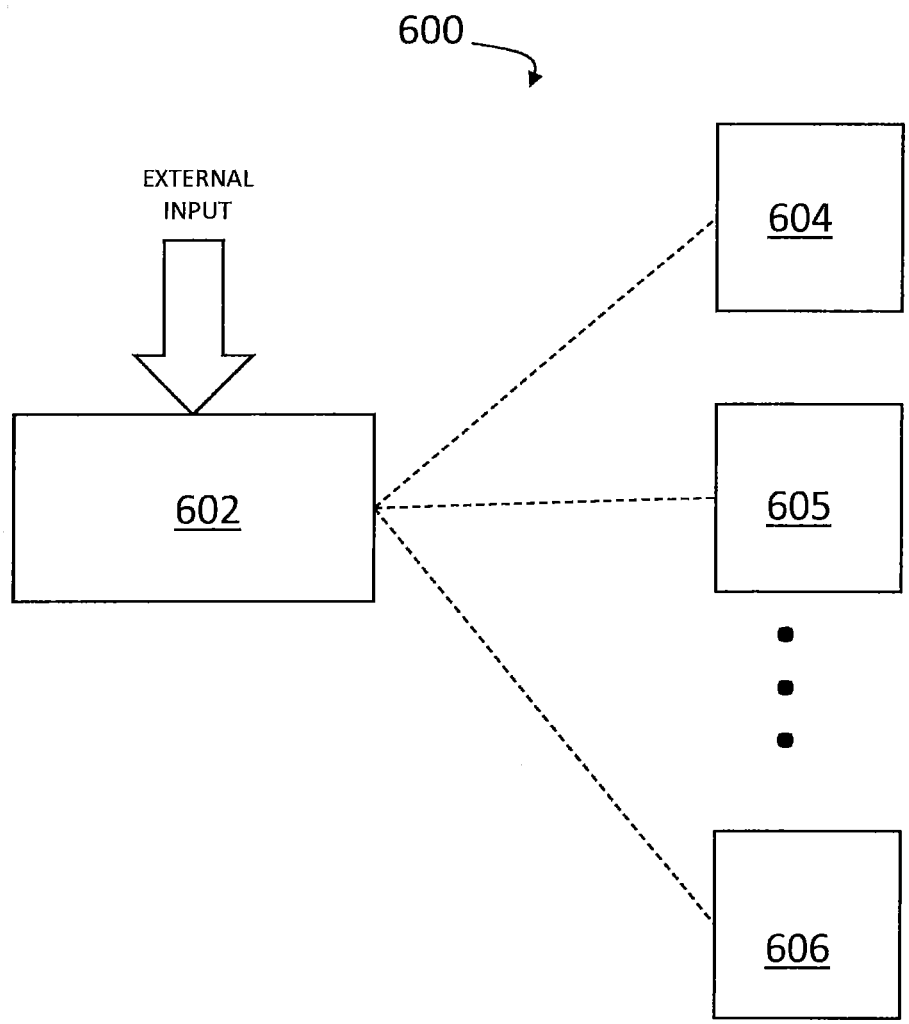
FIG. 7 is a schematic illustration showing a credential management system and a plurality of devices that use associated credentials according to an embodiment of the system described herein.

Referring to FIG. 7, a diagram 600 illustrates a credential manager 602 and a plurality of devices 604-60.6 that use associated credentials that are managed by the credential manager 602. In an embodiment herein, the credential manager 602 also manages and/or authenticates the primary credential and/or validates the primary credential revocation/validity status. The devices 604-606 communicate with the credential manager 602 to request validation of associated credentials used by the devices 604-606. As described in more detail elsewhere herein, the credential manager 602 may selectively revalidate associated credentials depending upon various criteria based, at least in part, on external input. For example, the owner of a lost device may instruct the credential manager 602 to invalidate the associated credential for the device so that no one else can use the device (e.g., for physical access).

Figure 8:
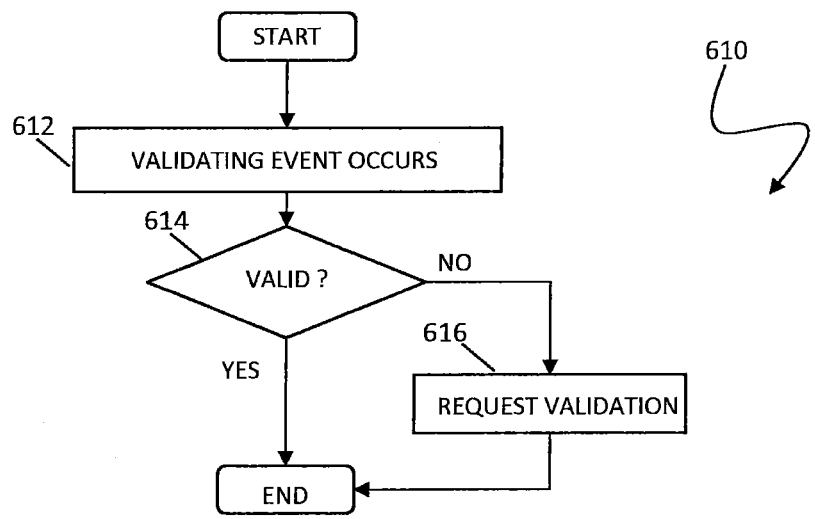
FIG. 8 is a flow diagram showing processing performed by a device in connection with validating an associated credential accord according to an embodiment of the system described herein.

Referring to FIG. 8, a flow diagram 610 illustrates a processing performed by a device that uses an associated credential. Processing begins at a first step 612 when a validating event occurs. As described elsewhere herein, a validating event is any event that causes the device to need/desire a valid associated credential. For example, if the device is a cell phone, the validating event may be the user anticipating need the cell phone for physical access and then manually engaging the system to cause the cell phone to have a valid credential. It is also possible for a validating event to be automatic (e.g., the credential was recently invalidated, a specific amount of time has passed, the device changes state, the device environment is trusted, or meets the credential usage conditions, etc.).

Following the step 612 is a test step 614 where it is determined is the associated credential is already valid. In some cases, the state of the associated credential and the validating event may be independent so that the validating event can occur even if the credential is already valid. For example, the device may already have a valid associated credential when a user manually engages the validation mechanism for the device. If it is determined at the test step 614 that the device already has a valid associated credential, then processing is complete. Otherwise, control transfers from the step 614 to a step 616 where the device requests validation from the credential manager. As discussed elsewhere herein, the credential manager may or may not validate the associated credential. Following the step 616, processing is complete.

Figure 9:
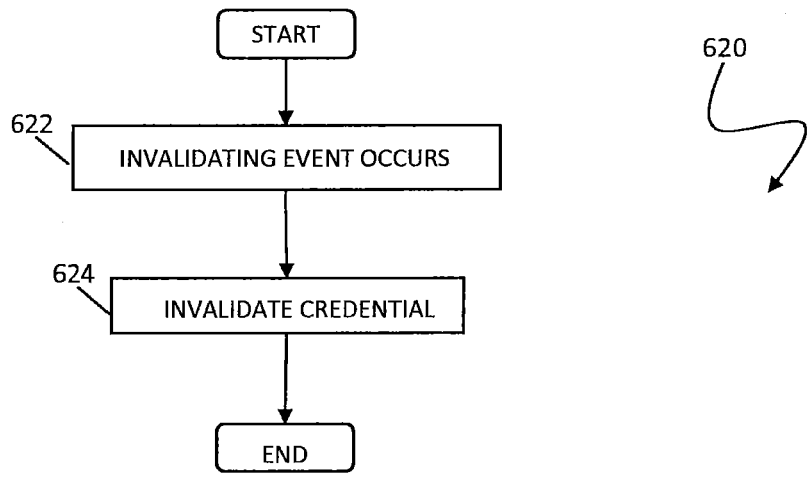
FIG. 9 is a flow diagram showing processing performed by a device in connection with invalidating an associated credential accord according to an embodiment of the system described herein.

Referring to FIG. 9, a flow diagram 620 illustrates steps performed in connection with an invalidating event occurring at the device. As discussed elsewhere herein, an associated credential may become invalid based on many different types of events and/or criteria. For example, an associated credential may be invalidated after a certain amount of time has passed, based on a user incorrectly entering a pin too many times, a change of state of the device, etc. It may also be possible for the credential manager to push a command to the device to cause the associated credential to become invalid.

Processing for the flow diagram begins at the step 622 where the invalidation event occurs. Following the step 622 is a step 624 where the device invalidates the associated credential or causes the associated credential to become invalidated. In some embodiments, the associated credential may be invalidated by altering or erasing some or all of the data for the associated credential. This may result in limiting or preventing its use. Following the step 624, processing is complete.

Figure 10:
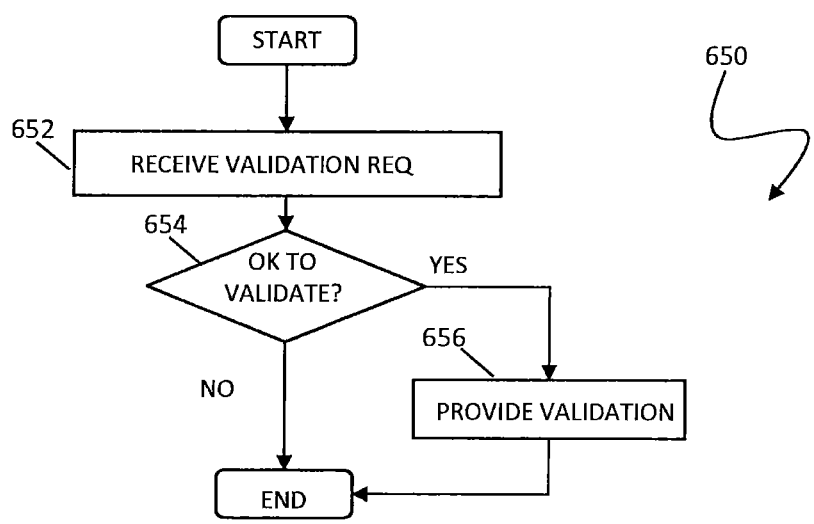
FIG. 10 is a flow diagram showing processing performed by a credential management system in connection with receiving a request from a device to validate an associated credential accord according to an embodiment of the system described herein.

Referring to FIG. 10, a flow diagram 650 illustrates processing performed by the credential manager in connection with receiving a request from a device to validate (reauthorize) an associated credential for the device. Processing begins at a first step 652 where the credential manager receives a request to validate an associated credential. Following the step 652 is a test step 654 where the credential manager determines if it is OK to validate the associated credential. As discussed elsewhere herein, in some instances, the credential manager may not validate an associated credential based on an external event, such as the user has reported a corresponding device lost or stolen, a particular time of day (e.g., providing physical access only at certain times), a user invalidating the associated credential from a UI of the device, a user improperly entering a pin value, the device entering sleep mode, the device locking its user interface, the device shutting down, etc.

If it is determined at the step 654 that it is not OK to validate the associated credential, then processing is complete. Otherwise, control transfers from the test step 654 to a step 656 where the credential manager provides validation for the associated credential and, if necessary, provides appropriate information to the device to the validation. Following the step 656, processing is complete.

The system described herein may be used with any authentication/validation technique or combination of techniques. Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only.

The invention claimed is:

1. A method of managing validity status of at least one of a plurality of associated credentials, comprising:
   providing a credential manager that selectively validates a particular one of the associated credentials for at least one device by validating a corresponding primary credential that is cryptographically independent from the plurality of the associated credentials, wherein the plurality of the associated credentials are deemed invalid when the corresponding primary credential is invalid; and
   the at least one device invalidating the particular one of the associated credentials while other ones of the plurality of the associated credentials and the corresponding primary credential remain valid.

2. The method, according to claim 1, wherein invalidating the particular one of the associated credential limits scope of use of the associated credential.

3. The method, according to claim 1, wherein invalidating the particular one of the associated credentials prevents use of the particular one of the associated credentials and wherein validating the particular one of the associated credentials allows use of the particular one of the associated credentials.

4. The method, according to claim 1, wherein the credential manager includes at least one of: a credential validation function and a credential revocation function.

5. The method, according to claim 1, wherein the particular one of the associated credential is invalidated based on an external event.

6. The method, according to claim 5, wherein the external event is selected from the group consisting of one or more of: a user invalidating the associated credential from a UI of the at least one device, a user improperly entering a pin value, a user indicating that a corresponding device is lost, the at least one device entering sleep mode, the at least one device locking a user interface thereof, the at least one device shutting down, the device losing connection to a network, the device leaving a location or area, the device configuration changing, and a particular time of day.

7. The method, according to claim 1, wherein the particular one of the associated credentials is provided on an integrated circuit card (ICC).

8. The method, according to claim 7, wherein the ICC is part of one of: a mobile phone and a smart card.

9. The method, according to claim 1, wherein the particular one of the associated credentials is provided within a trusted execution environment of a device.

10. The method, according to claim 1, wherein the particular one of the associated credentials is invalidated based on an internal event.

11. The method, according to claim 10, wherein the internal event is selected from the group consisting of one or more of: a counter reaching a limit, a clock reaching a limit, a configuration change of the trusted execution environment, and a configuration change of the ICC.

12. The method, according to claim 1, wherein particular one of the associated credentials is implemented using one of: iCLASS, Elliptic Curve Cryptography (ECC), X.509, Card Verifiable Certificate, and symmetric key cryptography and wherein the primary credential is an X.509 digital certificate.

13. The method, according to claim 1, further comprising:
the credential manager receiving external input indicating that the particular one of the associated credentials should not be validated.

14. The method, according to claim 13, wherein the external input is provided by a user.

15. The method, according to claim 1, wherein the particular one of the associated credentials is invalidated after the particular one of the associated credentials is used.

16. A validation system, comprising:
a credential manager that selectively validates a particular one of the associated credentials for at least one device by validating a corresponding primary credential that is cryptographically independent from the plurality of the associated credentials, wherein the plurality of the associated credentials are deemed invalid when the corresponding primary credential is invalid; and
at least one device, coupled to the credential manager, that invalidates the particular one of the associated credentials while other ones of the plurality of the associated credentials and the corresponding primary credential remain valid.

17. The validation system, according to claim 16, wherein the particular one of the associated credential is invalidated based on an external event.

18. The validation system, according to claim 17, wherein the external event is selected from the group consisting of one or more of: a user invalidating the associated credential from a UI of the at least one device, a user improperly entering a pin value, a user indicating that a corresponding device is lost, the at least one device entering sleep mode, the at least one device locking a user interface thereof, the at least one device shutting down, the device losing connection to a network, the device leaving a location or area, the device configuration changing, and a particular time of day.

19. The validation system, according to claim 16, wherein the particular one of the associated credentials is provided on an integrated circuit card (ICC).

20. The validation system, according to claim 19, wherein the ICC is part of one of: a mobile phone and a smart card.

21. The validation system, according to claim 16, wherein the particular one of the associated credentials is provided within a trusted execution environment of a device.

22. The validation system, according to claim 16, wherein the particular one of the associated credentials is invalidated based on an internal event.

23. The validation system, according to claim 22, wherein the internal event is selected from the group consisting of one or more of: a counter reaching a limit, a clock reaching a limit, a configuration change of the trusted execution environment, and a configuration change of the ICC.

24. The validation system, according to claim 16, wherein particular one of the associated credentials is implemented using one of: iCLASS, Elliptic Curve Cryptography (ECC), X.509, Card Verifiable Certificate, and symmetric key cryptography and wherein the primary credential is an X.509 digital certificate.

* * * * *